United States Patent
Wu et al.

(10) Patent No.: US 10,042,229 B2
(45) Date of Patent: Aug. 7, 2018

(54) GRATING, FABRICATING METHOD THEREFOR, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Huijie Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 93 days.

(21) Appl. No.: 15/134,886

(22) Filed: Apr. 21, 2016

(65) Prior Publication Data

US 2016/0377907 A1 Dec. 29, 2016
US 2017/0343849 A9 Nov. 30, 2017

(30) Foreign Application Priority Data

Jun. 25, 2015 (CN) .......................... 2015 1 0359451

(51) Int. Cl.
C09K 19/12 (2006.01)
G02F 1/137 (2006.01)
(Continued)

(52) U.S. Cl.
CPC .......... *G02F 1/13731* (2013.01); *C09K 19/12* (2013.01); *C09K 19/56* (2013.01); *C09K 19/586* (2013.01); *G02B 27/2214* (2013.01); *G02F 1/1341* (2013.01); *G02F 1/13439* (2013.01); *G02F 1/13781* (2013.01);
(Continued)

(58) Field of Classification Search
CPC ...................................................... C09K 19/12
See application file for complete search history.

(56) References Cited

U.S. PATENT DOCUMENTS

2012/0170115 A1  7/2012 Zhang et al.

FOREIGN PATENT DOCUMENTS

| CN | 103033995 A | 4/2013 |
|---|---|---|
| CN | 104530284 A | 4/2015 |
| CN | 104656338 A | 5/2015 |

OTHER PUBLICATIONS

China Office Action, Application No. 2015103594519, dated Oct. 9, 2016, 15 pps.

*Primary Examiner* — Chanceity Robinson
(74) *Attorney, Agent, or Firm* — Armstrong Teasdale LLP

(57) ABSTRACT

A grating is provided. The grating includes a first substrate and a second substrate opposite the first substrate, a plurality of first transparent electrodes arranged at equal intervals along a surface of the first substrate and between the first substrate and the second substrate, and a plurality of second transparent electrodes each arranged along a surface of the second substrate and opposite to a respective one of the plurality of first transparent electrodes, and a liquid crystal mixture layer arranged between each pair of the first transparent electrodes and respective second transparent electrodes, wherein a liquid crystal mixture in the liquid crystal mixture layer is switchable between a smectic phase and a cholesteric phase such that the liquid crystal mixture is transparent in the smectic phase and black in the cholesteric phase.

16 Claims, 4 Drawing Sheets

(51) Int. Cl.
   *G02F 1/1341*   (2006.01)
   *C09K 19/56*    (2006.01)
   *C09K 19/58*    (2006.01)
   *G02F 1/1343*   (2006.01)
   *G02F 1/29*     (2006.01)
   *G02B 27/22*    (2018.01)
   *C09K 19/32*    (2006.01)
   *C09K 19/52*    (2006.01)

(52) U.S. Cl.
   CPC ........ *G02F 1/134309* (2013.01); *G02F 1/292*
       (2013.01); *C09K 2019/122* (2013.01); *C09K 2019/323* (2013.01); *C09K 2019/521* (2013.01)

GRATING, FABRICATING METHOD THEREFOR, DISPLAY PANEL AND DISPLAY DEVICE

CROSS-REFERENCE TO RELATED APPLICATIONS

This application claims priority to Chinese Patent Application No. 201510359451.9, filed on Jun. 25, 2015, the entire content of which is incorporated by reference herein.

BACKGROUND

The embodiments of present disclosure relate to a grating, a fabricating method therefor, a display panel and a display device.

The principle of three dimension (3D) display technology is as follows: by making the respective images viewed by the left and right eyes to be different, i.e., letting the left eye view an image corresponding to the left eye and the right eye to view an image corresponding to the right eye, there is a parallax between the two eyes. Because of the existence of the parallax, people will see a stereo image during the process of viewing.

As shown in FIG. 1, a 3D display panel in the prior art is commonly formed by providing a layer of liquid crystal grating 02 on a surface of a 2D display panel 01 on the light emergent side. The liquid crystal grating 02 includes a first transparent substrate 11, a second transparent substrate 12 and a plurality of pairs of transparent electrodes 13 arranged at equal intervals in a direction parallel to the surfaces of the first and second transparent substrates between the first transparent substrate 11 and the second transparent substrate 12. Furthermore, the space between the first transparent substrate 11 and the second transparent substrate 12 is perfused with liquid crystal 14. In this way, when a respective voltage is applied to each pair of transparent electrodes 13, the liquid crystal 14 between the transparent electrodes 13 will be twisted such that several black stripes at equal intervals are displayed, and the displayed images are alternately arranged according to parallax barrier principle. As a result, the images captured respectively by the left and right eyes are slightly deviated such that they are viewed as a stereo image via the retina.

BRIEF DESCRIPTION

Embodiments of the present disclosure provide a grating, a fabricating method therefor, a display panel and a display device, which can achieve the switching between 2D display and 3D display.

In a first aspect, a grating is provided. The grating includes a first substrate and a second substrate opposite the first substrate, a plurality of first transparent electrodes arranged at equal intervals in a direction parallel to surfaces of the first substrate and the second substrate between the first substrate and the second substrate, and a plurality of second transparent electrodes each arranged opposite to a respective one of the plurality of first transparent electrodes, and a liquid crystal mixture layer arranged between each of the first transparent electrodes and its respective second transparent electrode, wherein a liquid crystal mixture in the liquid crystal mixture layer is switchable between a smectic phase and a cholesteric phase such that the liquid crystal mixture is transparent in the smectic phase and black in the cholesteric phase.

In one embodiment, the liquid crystal mixture layer includes a first mixture layer and a second mixture layer that are stacked, wherein the first mixture layer, when in the cholesteric phase, reflects light in a first range of visible light, and the second mixture layer, when in the cholesteric phase, reflects light in a second range of visible light not overlapping the first range of visible light.

In one embodiment, at least one of the first mixture layer and the second mixture layer has a thickness between and inclusive of 0.2 μm and 10.0 μm.

In one embodiment, a material of the liquid crystal mixture layer includes ethylene-vinyl acetate copolymer and a display mixture that includes a smectic liquid crystal, a chiral compound and ferroferric oxide nanoparticles.

In one embodiment, the display mixture further includes a nematic liquid crystal.

In one embodiment, the smectic liquid crystal is at least one of p-octyl biphenylcarbonitrile and p-dodecyl biphenylcarbonitrile, and the chiral compound is bis(4'-heptyl-1,1'-biphenyl-4-carboxylic acid) binaphtholate.

In one embodiment, a mass ratio of the display mixture to the ethylene-vinyl acetate copolymer is in the range of [3/7, 8/2].

In one embodiment, in the display mixture, a mass percent of the smectic liquid crystal is 30%-98%, a mass percent of the nematic liquid crystal is 0%-40%, a mass percent of the chiral compound is 1%-20%, and a mass percent of the ferroferric oxide nanoparticles is 1%-10%.

In a second aspect, a display panel is provided. The display panel includes a 2D display panel and the grating of the first aspect described above.

In one embodiment, a substrate on the light emergent side of the 2D display panel is the first substrate of the grating.

In a third aspect, a display device is provided. The display device includes the display panel of the second aspect described above.

In a fourth aspect, a fabricating method for a grating is provided. The method includes forming, on a first substrate, a plurality of first transparent electrodes arranged at equal intervals in a direction parallel to a surface of the first substrate, applying a liquid crystal mixture layer on each of the first transparent electrodes, wherein a liquid crystal mixture in the liquid crystal mixture layer is switchable between a smectic phase and a cholesteric phase such that the liquid crystal mixture is transparent in the smectic phase and black in the cholesteric phase, and disposing a second substrate with a plurality of second transparent electrodes arranged at equal intervals formed thereon on the first substrate with the liquid crystal mixture layer formed thereon so that each of the second transparent electrodes is arranged opposite to a respective one of the first transparent electrodes.

Embodiments described herein provide a grating, a fabricating method therefor, a display panel and a display device. The grating includes a first substrate and a second substrate opposite the first substrate, a plurality of first transparent electrodes arranged at equal intervals in a direction parallel to surfaces of the first substrate and the second substrate between the first substrate and the second substrate, and a plurality of second transparent electrodes each arranged opposite to a respective one of the plurality of first transparent electrodes, and a liquid crystal mixture layer arranged between each of the first transparent electrodes and its respective second transparent electrode, wherein a liquid crystal mixture in the liquid crystal mixture layer is switchable between a smectic phase and a cholesteric phase. When no voltage is applied between the first and second transparent electrodes, the liquid crystal mixture in the liquid crystal mixture layer is in the smectic phase and is transparent. When a prescribed voltage is applied between the first and second transparent electrodes, the liquid crystal mixture in the liquid crystal mixture layer is in the cholesteric phase and can reflect visible light of a certain wavelength and thus assumes a certain color. If a plurality of liquid crystal mixture layers are used as the liquid crystal mixture layer, different liquid crystal mixture layers may assume different colors, and after superimposed, they may assume black color. Such a grating may substitute the liquid crystal grating in the existing 3D display panel, and achieve the switching between 2D display and 3D display.

BRIEF DESCRIPTION OF THE DRAWINGS

For the sake of describing the technical solutions of the embodiments of the disclosure more clearly, the accompany drawings of the example embodiments will be briefly described below, and obviously, the accompany drawings described below merely relate to some example embodiments of the disclosure and are not a limitation to the disclosure.

DETAILED DESCRIPTION

The technical solutions of the embodiments described herein will be clearly and completely descried hereinafter in conjunction with the accompanying drawing. Obviously, the example embodiments are only some of rather than all of the embodiments of the disclosure. All other embodiments obtained by those skilled in the art based on the embodiments described herein without any creative work will all fall into the scope of the disclosure.

Furthermore, terms such as "first" and "second" are used only for the purpose of description and shall not be understood to indicate or suggest the relative importance or suggest the number of the technical feature indicated. Therefore, the technical feature that is defined by "first" or "second" may explicitly or implicitly include one or more such feature. In the description of the disclosure, the phrase "a plurality" means two or more.

Figure 2:
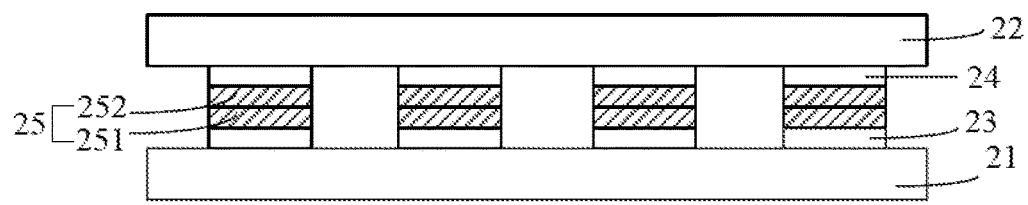
FIG. 2 schematically illustrates a structure of a grating according to an embodiment.

In a first aspect, an example embodiment provides a grating, as shown in FIG. 2, including:

a first substrate 21 and a second substrate 22 opposite the first substrate 21;

a plurality of first transparent electrodes 23 arranged at equal intervals in a direction parallel to surfaces of the first substrate 21 and the second substrate 22 between the first substrate 21 and the second substrate 22, and a plurality of second transparent electrodes 24 each arranged opposite to a respective one of the plurality of first transparent electrodes 23; and a liquid crystal mixture layer 25 arranged between each of the first transparent electrodes 23 and its respective second transparent electrode 24, wherein a liquid crystal mixture in the liquid crystal mixture layer 25 is switchable between a smectic phase and a cholesteric phase such that the liquid crystal mixture is transparent in the smectic phase and black in the cholesteric phase.

Specifically, a liquid crystal having the cholesteric property may contain a plurality of layers of molecules, wherein the molecules in a same layer have a same orientation, and the orientation of the molecules in one layer rotates approximately 15° relative to the orientation of the molecules in its adjacent layer, and the layers of molecules laminates so as to form a helical structure. When the orientation of the molecules rotates 360°, it becomes the original orientation. The distance between two layers of molecules of the same orientation is known as the pitch of a cholesteric liquid crystal. When the product of the pitch of the liquid crystal mixture in cholesteric phase in the liquid crystal mixture layer 25 and the average refractive index of the liquid crystal mixture falls into the wavelength range of visible light (380~780 nanometers (nm)), the liquid crystal mixture in the liquid crystal mixture layer 25 can reflect visible light with a certain wavelength and assumes a certain color.

Therefore, the liquid crystal mixture in the liquid crystal mixture layer 25 is in the cholesteric phase when a prescribed driving voltage is applied between the first transparent electrodes 23 and the second transparent electrodes 24, so it can reflect the visible light with a certain wavelength and thus assumes the color corresponding to the wavelength. If the liquid crystal mixture layer 25 includes a plurality of mixture layers (for example, a first mixture layer 251 and a second mixture layer 252) that are stacked, different mixture layers assume different colors and a black color is assumed after superposition. In this way, the grating in the example embodiment can substitute for the liquid crystal grating in the 3D display panel of the prior art, and 3D display is achieved.

For example, when the first mixture layer 251 reaches the transition temperature, the liquid crystal mixture in the first mixture layer 251 is in the cholesteric phase and thus can reflect the light in a first range of visible light, for example, red light such that the first mixture layer 251 assumes red. Meanwhile, when the second mixture layer 252 reaches the transition temperature, the liquid crystal mixture in the second mixture layer 252 is in the cholesteric phase and thus can reflect the light in a second range of visible light that does not overlap with the first range of visible light, for example, blue light such that the second mixture layer 252 assumes blue. Therefore, a black color is assumed after the first mixture layer 251 assuming red and the second mixture layer 252 assuming blue are superimposed, and a grating is formed.

Specifically, the material of the liquid crystal mixture layer 25 includes ethylene-vinyl acetate copolymer and a display mixture, wherein the display mixture may specifically include a smectic liquid crystal, a chiral compound and ferroferric oxide nanoparticles.

Figure 3A:
FIG. 3A illustrates the chemical structural formula of p-octyl biphenylcarbonitrile.
Figure 3B:
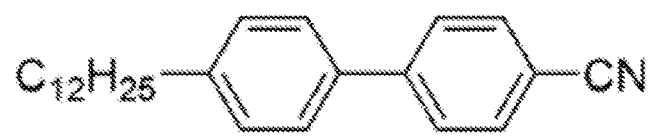
FIG. 3B illustrates the chemical structural formula of p-dodecyl biphenylcarbonitrile.

Herein, the smectic liquid crystal refers to a liquid crystal in which the molecules are ordered just similar to a crystal. For example, the smectic liquid crystal may be p-octyl biphenylcarbonitrile with a chemical structural formula as shown in FIG. 3A, or may be p-dodecyl biphenylcarbonitrile with a chemical structural formula as shown in FIG. 3B.

Furthermore, the number of the carbon atoms in each carbon chain in the smectic liquid crystal may vary in the range of 2 to 16, which is not limited in the embodiments described herein.

Figure 3C:
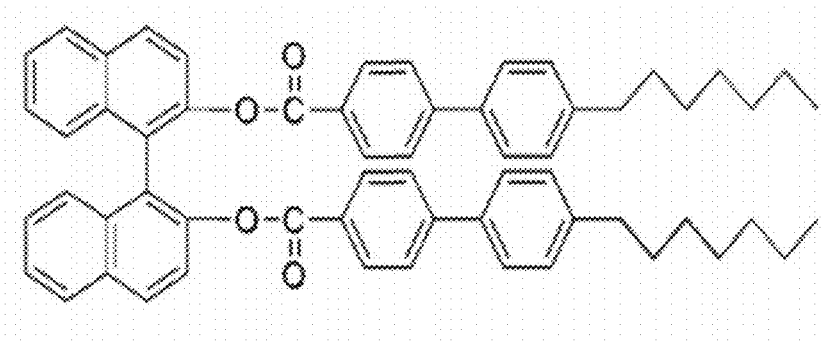
FIG. 3C illustrates the chemical structural formula of bis(4'-heptyl-1,1'-biphenyl-4-carboxylic acid) binaphtholate.

The chiral compound refers to a compound containing a pair of moleculars which have the same molecular weight and molecular structure but the arrangements of which are mirror symmetric, just like an entity and its mirror image. For example, the chiral compound may be bis(4'-heptyl-1, 1'-biphenyl-4-carboxylic acid) binaphtholate, of which the chemical structural formula is shown in FIG. 3C.

Also, the number of the carbon chains in the chiral compound may vary, which is not limited in the embodiments described herein.

Figure 3D:
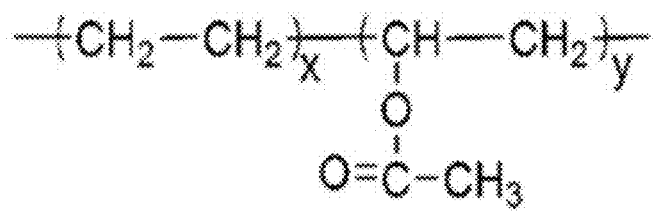
FIG. 3D illustrates the chemical structural formula of ethylene-vinyl acetate copolymer.

Ethylene-vinyl acetate copolymer is a macromolecular polymer that is different from micromolecular, of which the chemical structural formula is shown in FIG. 3D. The ethylene-vinyl acetate copolymer has a high viscosity, large molecular mass, is linear and can form a network. Because of these characteristics, the ethylene-vinyl acetate copolymer may anchor the molecular arrangement of the micromolecular substance (for example, a chiral compound, a smectic liquid crystal or the like). Therefore, the liquid crystal mixture in the liquid crystal mixture layer 25 can be anchored in certain microdomains to form a thin film so that the liquid crystal mixture layer 25 is fixed between each first transparent electrode 23 and its respective second transparent electrode 24.

Figure 4:
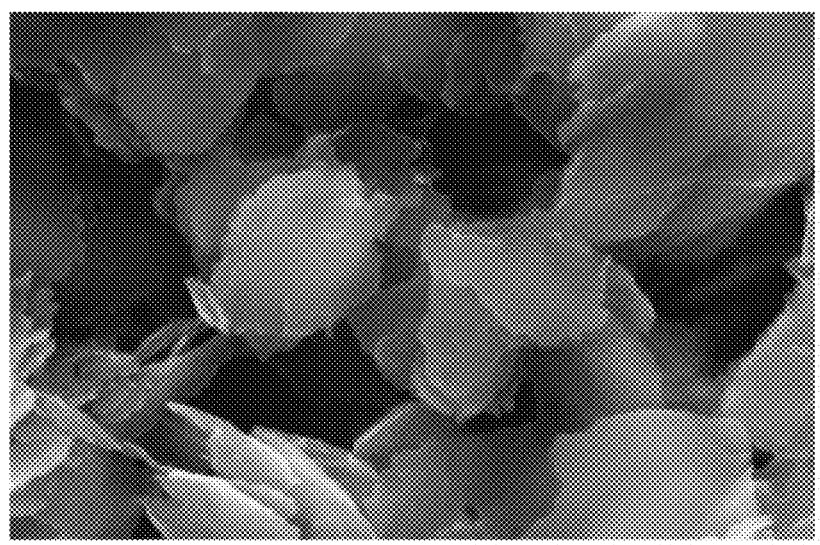
FIG. 4 illustrates a SEM (scan electronic microscope) morphology of the ethylene-vinyl acetate copolymer.

For example, FIG. 4 illustrates the SEM morphology of the ethylene-vinyl acetate copolymer after the micromolecular substance is removed by a solvent. As can be seen in FIG. 4, the ethylene-vinyl acetate copolymer has a network-like skeleton structure and a lamellar microscopic morphology such that it can stabilize the micromolecular substance in small meshes. Therefore, an effect of stabilizing the liquid crystal mixture in the liquid crystal mixture layer 25 into certain microdomains and preventing it from flowing can be achieved.

Figure 1:
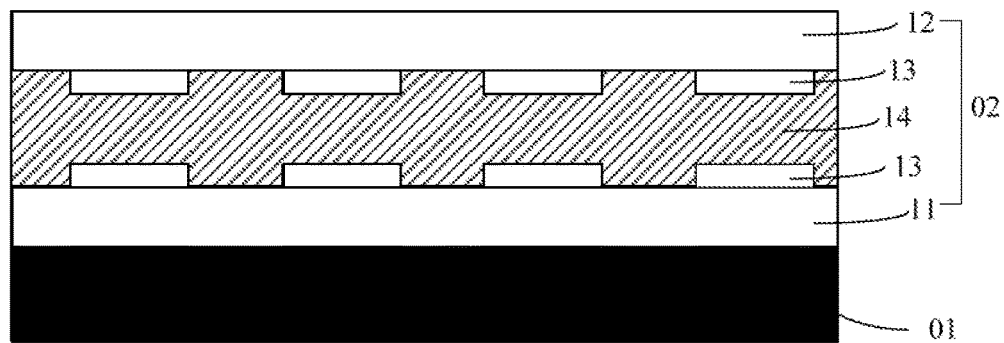
FIG. 1 schematically illustrates a structure of a 3D display panel of the prior art.

As compared with the 3D display panel of the prior art as shown in FIG. 1, the embodiments described herein provide a novel grating in which the liquid crystal mixture in the liquid crystal mixture layer 25 can be stabilized into certain micriodomains and prevented from flowing. Therefore when the grating is used to fabricate a display panel, the first transparent substrate 11 in FIG. 1 is not necessary. The first transparent electrodes 23 and the second transparent electrodes 24 can be directly disposed on a first substrate, and the liquid crystal mixture layer 15 can be provided between the first transparent electrodes 23 and the second transparent electrodes 24. The thickness of the display panel provided can be significantly decreased because the thickness of the first transparent substrate 11 is omitted.

The display mixture may further include nematic liquid crystal such as SLC1717. Herein the nematic liquid crystal refers to a liquid crystal in the nematic phase. The nematic liquid crystal may be a mixture of any positive micromolecular liquid crystal.

In one embodiment, the ferroferric oxide nanoparticles in the display mixture can covert the electromagnetic energy into thermal energy, which increases the temperature of the liquid crystal mixture in the liquid crystal mixture layer 25 such that the liquid crystal mixture that is in smectic phase originally transforms into a liquid crystal mixture in cholesteric phase.

Figure 5:
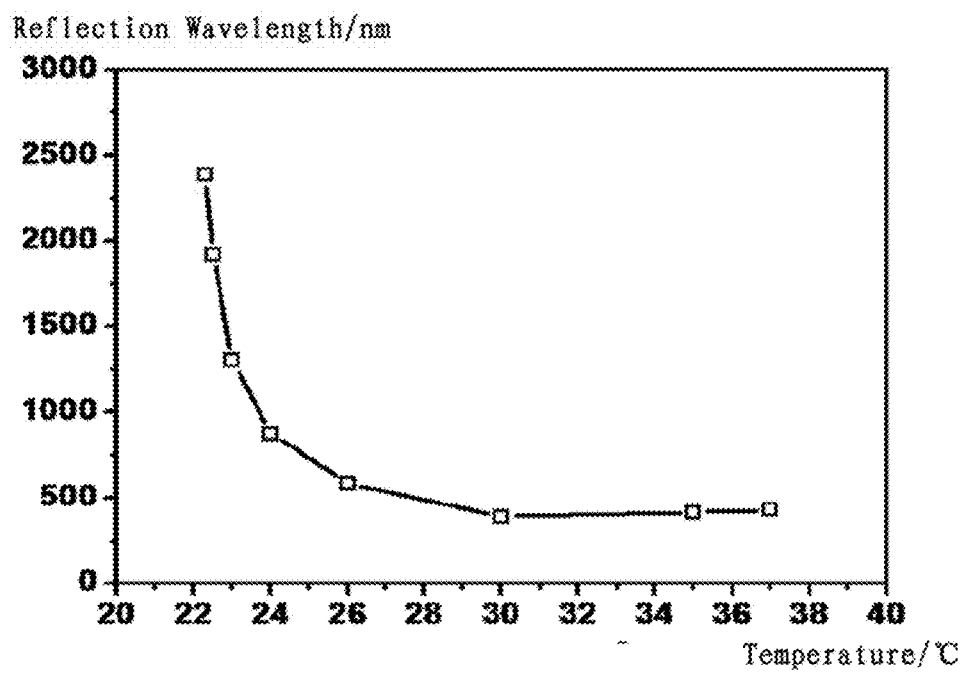
FIG. 5 schematically illustrates the relationship between the temperature of a liquid crystal mixture in a liquid crystal mixture layer and the reflection wavelength thereof in a grating of an embodiment.

For example, as shown in FIG. 5, the temperature of the liquid crystal mixture in the liquid crystal mixture layer 25 increases under the action of the ferroferric oxide nanoparticles. When the temperature increases to be the transition temperature or higher, the liquid crystal mixture is in the cholesteric phase and the reflection wavelength thereof decreases from infinity to the range of visible light (380~780 nm) so as to be able to reflect visible light of a certain color.

In this way, by adjusting the concentration of the ferroferric oxide nanoparticles and the voltage applied to the liquid crystal mixture layer 25, the colors of the light reflected by the liquid crystal mixture in the liquid crystal mixture layer 27 may be superimposed to be black so as to achieve the function of the liquid crystal grating 02 in the 3D display panel of the prior art and then achieve 3D display.

Figure 6:
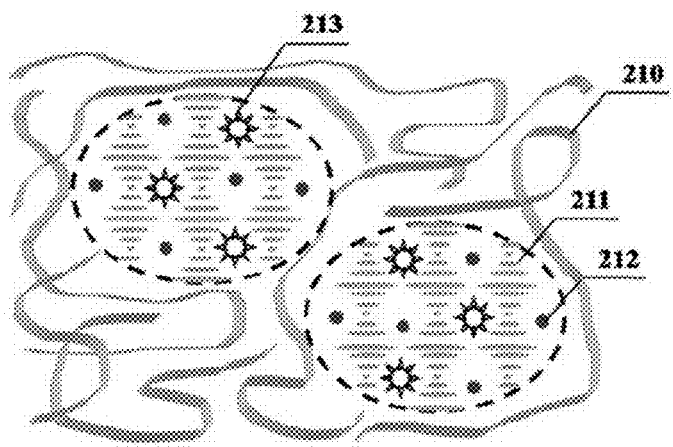
FIG. 6 schematically illustrates the structure of a liquid crystal mixture in a liquid crystal mixture layer in a grating of an embodiment.

For example, FIG. 6 schematically illustrates the structure of a liquid crystal mixture of the ethylene-vinyl acetate copolymer, the smectic liquid crystal, the nematic liquid crystal, the chiral compound and the ferroferric oxide nanoparticles in the liquid crystal mixture layer 27, in which the ethylene-vinyl acetate copolymer is indicated by 210, the smectic liquid crystal and the nematic liquid crystal are indicated by 211, the chiral compound is indicated by 212 and the ferroferric oxide nanoparticles are indicated by 213. It can be seen that the ethylene-vinyl acetate copolymer 210 has a network-like skeleton structure that can stabilize the micromolecular substance such as the smectic liquid crystal, the nematic liquid crystal, the chiral compound and the ferroferric oxide nanoparticles into small meshes so as to achieve the effect of stabilizing the liquid crystal mixture of the liquid crystal mixture layer 25 in certain microdomains and preventing it from flow.

In one embodiment, a mass ratio of the display mixture to the ethylene-vinyl acetate copolymer may be in the range of 3:7 to 8:2.

In one embodiment, in the display mixture, a mass percent of the smectic liquid crystal may be 30%-98%, a mass percent of the nematic liquid crystal may be 0%-40%, a mass percent of the chiral compound may be 1%-20%, and a mass percent of the ferroferric oxide nanoparticles may be 1%-10%.

In one embodiment, at least one of the first mixture layer 251 and the second mixture layer 252 may have a thickness between and inclusive of 0.2 microns ($\mu m$) and 10.0 $\mu m$.

The liquid crystal mixture layer 25 between the first transparent electrodes 23 and the second transparent electrodes 24 may be provided as a multi-layer structure. In the following description of the example embodiments, the first mixture layer 251 and the second mixture layer 252 as shown in FIG. 2 is taken as an example.

In one possible implementation mode, the liquid crystal mixtures in the first mixture layer 251 and the second mixture layer 252 have a same mixture ratio.

In this implementation mode, in the display mixture of the first mixture layer 251 and the second mixture layer 252, the mass percents of p-octyl biphenylcarbonitrile, p-dodecyl biphenylcarbonitrile, SLC1717, bis(4'-heptyl-1,1'-biphenyl- 4-carboxylic acid) binaphtholate and the ferroferric oxide nanoparticles are respectively: 68.6%, 16.8%, 9.6%, 4.0% and 1.0%.

The mass percents of the display mixture and the ethylene-vinyl acetate copolymer in the first mixture layer 251 and the second mixture layer 252 are respectively 50% and 50%.

The thickness of the first mixture layer 251 is 0.5 µm and the thickness of the second mixture layer 252 is 0.3 µm.

Therefore, when a driving voltage is applied between the first transparent electrodes 23 and the second transparent electrodes 24, the ferroferric oxide nanoparticles in the first mixture layer 251 convert the electromagnetic energy into thermal energy, which increases the temperature of the first mixture layer 251 such that the first mixture layer 251 transforms into a cholesteric liquid crystal mixture that reflects red light and assumes red. Similarly, the ferroferric oxide nanoparticles in the second mixture layer 252 convert the electromagnetic energy into thermal energy, which increases the temperature of the second mixture layer 252 such that the second mixture layer 252 transforms into a cholesteric liquid crystal mixture that reflects blue light and assumes blue. The red color and the blue color are superposed to be black color, thus a grating is formed and 3D display is achieved.

In another possible implementation mode, the mixture ratio of the liquid crystal mixture in the first mixture layer 251 is different from that in the second mixture layer 252 as shown in FIG. 2.

In this implementation mode, in the display mixture of the first mixture layer 251, the mass percents of p-octyl biphenylcarbonitrile, p-dodecyl biphenylcarbonitrile, SLC1717, bis(4'-heptyl-1,1'-biphenyl-4-carboxylic acid) binaphtholate and the ferroferric oxide nanoparticles are respectively: 62.6%, 26.8%, 5.6%, 3.0% and 2.0%.

The mass percents of the display mixture and the ethylene-vinyl acetate copolymer in the first mixture layer 251 are respectively 40% and 60%.

The thickness of the first mixture layer 251 is 0.1 µm.

Correspondingly, in the display mixture of the second mixture layer 252, the mass percents of p-octyl biphenylcarbonitrile, p-dodecyl biphenylcarbonitrile, SLC1717, bis(4'-heptyl-1,1'-biphenyl-4-carboxylic acid) binaphtholate and the ferroferric oxide nanoparticles are respectively: 61.6%, 25.8%, 5.6%, 3.0% and 4.0%.

The mass percents of the display mixture and the ethylene-vinyl acetate copolymer in the second mixture layer 252 are respectively 40% and 60%.

The thickness of the second mixture layer 252 is 0.2 µm in such a circumstance.

Therefore, when a driving voltage is applied between the first transparent electrodes 23 and the second transparent electrodes 24, the ferroferric oxide nanoparticles in the first mixture layer convert the electromagnetic energy into thermal energy, which increases the temperature of the first mixture layer 251 such that the first mixture layer 251 transforms into a cholesteric liquid crystal mixture that reflects green light and assumes green. Similarly, the ferroferric oxide nanoparticles in the second mixture layer 252 convert the electromagnetic energy into thermal energy, which increases the temperature of the second mixture layer 252 such that the second mixture layer 252 transforms into a cholesteric liquid crystal mixture that reflects purple light and assumes purple. The green color and the purple color are superposed to be black color, thus a grating is formed and 3D display is achieved.

In still another possible implementation mode, the mixture ratio of the liquid crystal mixture in the first mixture layer 251 is same as that in the second mixture layer 252 as shown in FIG. 2, but neither the first mixture layer 251 nor the second mixture layer 252 contains nematic liquid crystal.

In this implementation mode, in the display mixture of the first mixture layer 251 and the second mixture layer 252, the mass percents of p-octyl biphenylcarbonitrile, p-dodecyl biphenylcarbonitrile, bis(4'-heptyl-1,1'-biphenyl-4-carboxylic acid) binaphtholate and the ferroferric oxide nanoparticles are respectively: 50.0%, 46.0%, 1.0% and 3.0%.

The mass percents of the display mixture and the ethylene-vinyl acetate copolymer in the first mixture layer 251 and the second mixture layer 252 are respectively 60% and 40%.

In this implementation mode, the thickness of the first mixture layer 251 is 2.0 µm, and the thickness of the second mixture layer 252 is 1.5 µm.

Therefore, when a driving voltage is applied between the first transparent electrodes 23 and the second transparent electrodes 24, the ferroferric oxide nanoparticles in the first mixture layer 251 convert the electromagnetic energy into thermal energy, which increases the temperature of the first mixture layer 251 such that the first mixture layer 251 transforms into a cholesteric liquid crystal mixture that reflects green light and assumes green. Similarly, the ferroferric oxide nanoparticles in the second mixture layer 252 convert the electromagnetic energy into thermal energy, which increases the temperature of the second mixture layer 252 such that the second mixture layer 252 transforms into a cholesteric liquid crystal mixture that reflects purple light and assumes purple. The green color and the purple color are superposed to be black color, thus a grating is formed and 3D display is achieved.

Accordingly, the embodiments described herein provide a fabricating method for a grating, including:

forming, on a first substrate, a plurality of first transparent electrodes arranged at equal intervals in a direction parallel to a surface of the first substrate;

applying a liquid crystal mixture layer on each of the first transparent electrodes, wherein a liquid crystal mixture in the liquid crystal mixture layer is switchable between a smectic phase and a cholesteric phase such that the liquid crystal mixture is transparent in the smectic phase and black in the cholesteric phase; and disposing a second substrate with a plurality of second transparent electrodes arranged at equal intervals formed thereon on the first substrate with the liquid crystal mixture layer formed thereon so that each of the second transparent electrodes is arranged opposite to a respective one of the first transparent electrodes.

Figure 7:
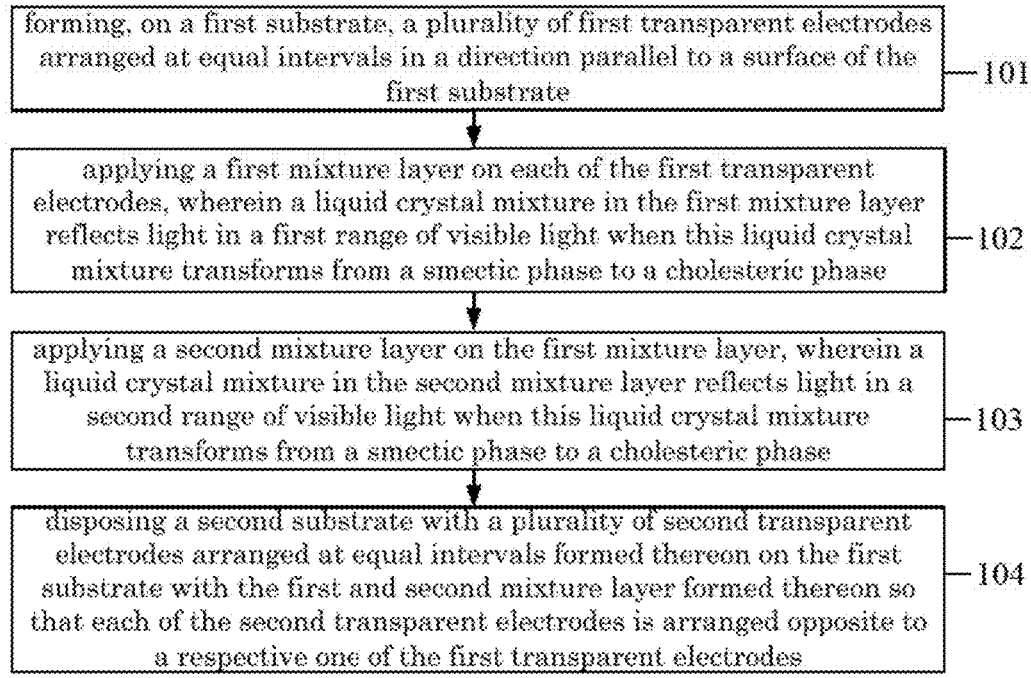
FIG. 7 schematically illustrates a flowchart of a fabricating method for a grating in an example according to an embodiment.

In one example embodiment, as shown in FIG. 7, the fabricating method for a grating may include the following steps 101, 102, 103 and 104.

Step 101: forming, on a first substrate, a plurality of first transparent electrodes arranged at equal intervals in a direction parallel to a surface of the first substrate.

Specifically, as shown in FIG. 2, on a first substrate 21, a plurality of first transparent electrodes 23 may be formed at equal intervals in a direction parallel to a surface of the first substrate 21 by using etching process.

Step 102: applying a first mixture layer on each of the first transparent electrodes, wherein a liquid crystal mixture in the first mixture layer reflects light in a first range of visible light when this liquid crystal mixture transforms from a smectic phase to a cholesteric phase.

Step 103: applying a second mixture layer on the first mixture layer, wherein a liquid crystal mixture in the second mixture layer reflects light in a second range of visible light when this liquid crystal mixture transforms from a smectic phase to a cholesteric phase.

Herein, the first range of visible light does not overlap the second range of visible light.

Specifically, reference may be made to FIG. 2 and relevant description in the above embodiments, the materials of the first mixture layer 251 and the second mixture layer 252 may include ethylene-vinyl acetate copolymer and a display mixture that includes a smectic liquid crystal, a chiral compound and ferroferric oxide nanoparticles.

For example, the smectic liquid crystal may be at least one of p-octyl biphenylcarbonitrile and p-dodecyl biphenylcarbonitrile, and the chiral compound may be bis(4'-heptyl-1,1'-biphenyl-4-carboxylic acid) binaphtholate.

In one embodiment, a mass ratio of the display mixture to the ethylene-vinyl acetate copolymer may be any ratio in the range of 3:7 to 8:2.

In one embodiment, in the display mixture, a mass percent of the smectic liquid crystal may be 30%-98%, a mass percent of the nematic liquid crystal may be 0%-40%, a mass percent of the chiral compound may be 1%-20%, and a mass percent of the ferroferric oxide nanoparticles may be 1%-10%.

In one embodiment, at least one of the first mixture layer 251 and the second mixture layer 252 may have a thickness between and inclusive of 0.2 μm and 10.0 μm.

Step 104: disposing a second substrate with a plurality of second transparent electrodes arranged at equal intervals formed thereon on the first substrate with the first and second mixture layer formed thereon so that each of the second transparent electrodes is arranged opposite to a respective one of the first transparent electrodes.

Under the action of the ferroferric oxide nanoparticles, the temperature of the liquid crystal mixture in each of the first mixture layer 251 and the second mixture layer 252 may increase. When the temperature increases to be the transition temperature or higher, the liquid crystal mixture is in cholesteric phase and the reflection wavelength thereof is decreased from infinity to the range of visible light (380~780 nm), and thereby the liquid crystal mixture may reflect visible light of a certain color.

Therefore, by applying a voltage to the first mixture layer 251 and the second mixture layer 252, the liquid crystal mixtures in the first mixture layer 251 and the second mixture layer 252 may reflect different colors under the action of the ferroferric oxide nanoparticles. The superposition of different colors leads to the black color, therefore the function of the liquid crystal grating 02 (FIG. 1) in the existing 3D display panel can be achieved and 3D display may be achieved.

Furthermore, the embodiments described herein provide a display panel including a 2D display panel and the grating described above.

The grating may be provided on the light emergent side of the 2D display panel. In this way, the liquid crystal mixture layer in the grating is transparent in smectic phase, and therefore the 2D display panel can still be used for 2D display. When a driving voltage is applied to the grating, a grating will be formed the liquid crystal mixture layer in the grating is black in cholesteric phase, i.e., a grating is formed. Therefore 3D display can be performed together with the 2D display panel, thus the switch between 2D display and 3D display can be achieved.

Figure 8:
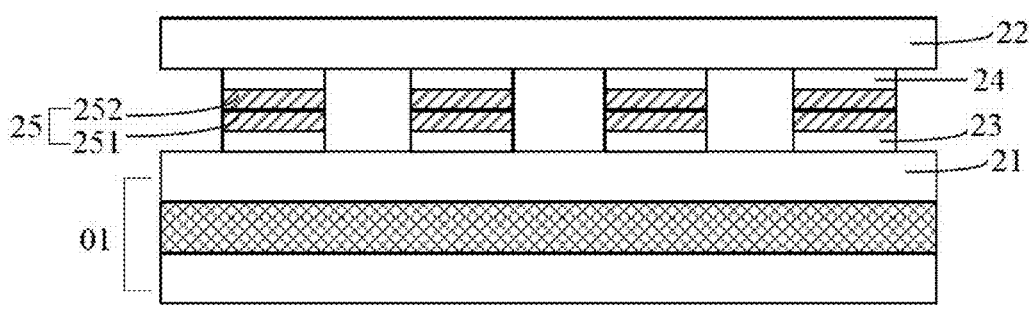
FIG. 8 schematically illustrates the structure of a display panel in an embodiment.

Furthermore, FIG. 8 illustrates a display panel in an example embodiment, in which the substrate on the light emergent side of the 2D display panel 01 may be the first substrate 21 of the grating so as to reduce the thickness of the display panel.

Furthermore, the embodiments described herein provide a display device including the 3D display panel mentioned above. The display device may be any product or a component with the function of display such as a liquid crystal panel, an electronic paper, an OLED panel, a cell phone, a tablet computer, a television, a display, a laptop, a digital photo frame, a navigator or the like Embodiments described herein provide a grating, a fabricating method therefor, a display panel and a display device. The grating includes a first substrate and a second substrate opposite the first substrate, a plurality of first transparent electrodes arranged at equal intervals in a direction parallel to surfaces of the first substrate and the second substrate between the first substrate and the second substrate, and a plurality of second transparent electrodes each arranged opposite to a respective one of the plurality of first transparent electrodes, and a liquid crystal mixture layer arranged between each of the first transparent electrodes and its respective second transparent electrode, wherein a liquid crystal mixture in the liquid crystal mixture layer is switchable between a smectic phase and a cholesteric phase. When no voltage is applied between the first and second transparent electrodes, the liquid crystal mixture in the liquid crystal mixture layer is in the smectic phase and is transparent. When a prescribed voltage is applied between the first and second transparent electrodes, the liquid crystal mixture in the liquid crystal mixture layer is in the cholesteric phase and can reflect visible light of a certain wavelength and thus assumes a certain color. If a plurality of liquid crystal mixture layers are used as the liquid crystal mixture layer, different liquid crystal mixture layers may assume different colors, and after superimposed, they may assume black color. Such a grating may substitute the liquid crystal grating in the existing 3D display panel, and achieve the switching between 2D display and 3D display.

In the description of the disclosure, specific features, structures, materials or characteristics may be combined properly in any one or more embodiments or examples.

The description hereinbefore is only for the purpose of illustrating the example embodiments of the disclosure, but the scope of the disclosure is not limited thereto. Any variations or substitutions that one skilled in the art may easily come up with according to the disclosure shall all fall into the scope of the disclosure. Therefore, the scope of the disclosure shall be defined by the appended claims.

What is claimed is:

1. A grating, comprising:
   a first substrate and a second substrate opposite the first substrate;
   a plurality of first transparent electrodes arranged at equal intervals along a surface of the first substrate and between the first substrate and the second substrate, and a plurality of second transparent electrodes each arranged along a surface of the second substrate and opposite to a respective one of the plurality of first transparent electrodes; and
   a liquid crystal mixture layer arranged between each pair of the first transparent electrodes and respective second transparent electrodes, wherein a liquid crystal mixture in the liquid crystal mixture layer is switchable from a smectic phase to a cholesteric phase when a temperature is increased to a transition temperature or a higher temperature than the transition temperature and is switchable from the cholesteric phase to the smectic phase when the temperature is decreased to the transition temperature or a lower temperature than the transition temperature, wherein the transition temperature is higher than 24° C. and lower than 37° C., the liquid crystal mixture is transparent in the smectic phase and black in the cholesteric phase, and wherein a material of the liquid crystal mixture layer comprises ethylene-vinyl acetate copolymer and a display mixture that comprises a smectic liquid crystal, a chiral compound, and ferroferric oxide nanoparticles.

2. The grating according to claim 1, wherein the liquid crystal mixture layer comprises a first mixture layer and a second mixture layer that are stacked upon one another, and wherein the first mixture layer, when in the cholesteric phase, reflects light in a first range of visible light; and the second mixture layer, when in the cholesteric phase, reflects light in a second range of visible light not overlapping the first range of visible light.

3. The grating according to claim 2, wherein at least one of the first mixture layer and the second mixture layer has a thickness between and inclusive of 0.2 µm and 10.0 µm.

4. The gating according to claim 1, wherein the display mixture further comprises a nematic liquid crystal.

5. The grating according to claim 1, wherein the smectic liquid crystal is at least one of p-octyl biphenylcarbonitrile and p-dodecyl biphenylcarbonitrile, and wherein the chiral compound is bis(4'-heptyl-1,1'-biphenyl-4-carboxylic acid) binaphtholate.

6. The grating according to claim 4, wherein the smectic liquid crystal is at least one of p-octyl biphenylcarbonitrile and p-dodecyl biphenylcarbonitrile, and wherein the chiral compound is bis(4'-heptyl-1,1'-biphenyl-4-carboxylic acid) binaphtholate.

7. The grating according to claim 1, wherein a mass ratio of the display mixture to the ethylene-vinyl acetate copolymer is in the range of 3:7 to 8:2.

8. The grating according to claim 4, wherein a mass ratio of the display mixture to the ethylene-vinyl acetate copolymer is in the range of 3:7 to 8:2.

9. The grating according to claim 4, wherein in the display mixture, a mass percent of the smectic liquid crystal is 30%-98%, a mass percent of the nematic liquid crystal is more than 0% and not more than 40%, a mass percent of the chiral compound is 1%-20%, and a mass percent of the ferroferric oxide nanoparticles is 1%-10%.

10. A display panel, comprising a 2D display panel and the grating according to claim 1.

11. The display panel according to claim 6, wherein a substrate on a light emergent side of the 2D display panel is the first substrate of the grating.

12. A display panel, comprising a 2D display panel and the grating according to claim 2.

13. A display panel, comprising a 2D display panel and the grating according to claim 3.

14. A display device, comprising the display panel according to claim 10.

15. A display device, comprising the display panel according to claim 11.

16. A fabricating method for a grating, comprising:

forming, on a surface of a first substrate, a plurality of first transparent electrodes arranged at equal intervals along the surface;

applying a liquid crystal mixture layer on each of the first transparent electrodes, wherein a liquid crystal mixture in the liquid crystal mixture layer is switchable from a smectic phase to a cholesteric phase when a temperature is increased to a transition temperature or a higher temperature than the transition temperature and is switchable from the cholesteric phase to the smectic phase when the temperature is decreased to the transition temperature or a lower temperature than the transition temperature, wherein the transition temperature is higher than 24° C. and lower than 37° C., the liquid crystal mixture is transparent in the smectic phase and black in the cholesteric phase, and wherein a material of the liquid crystal mixture layer comprises ethylene-vinyl acetate copolymer and a display mixture that comprises a smectic liquid crystal, a chiral compound, and ferroferric oxide nanoparticles; and forming a plurality of second transparent electrodes between the liquid crystal mixture layer and a surface of a second substrate such that each of the second transparent electrodes is arranged opposite to a respective one of the first transparent electrodes.

* * * * *

UNITED STATES PATENT AND TRADEMARK OFFICE
CERTIFICATE OF CORRECTION

PATENT NO. : 10,042,229 B2
APPLICATION NO. : 15/134886
DATED : August 7, 2018
INVENTOR(S) : Xiaojuan Wu et al.

It is certified that error appears in the above-identified patent and that said Letters Patent is hereby corrected as shown below:

In the Claims

In Claim 4, Column 11, Line 25, delete "The gating according" and insert therefor -- The grating according --.

Signed and Sealed this
Twenty-ninth Day of January, 2019

Andrei Iancu
*Director of the United States Patent and Trademark Office*